(12) United States Patent
Ahn et al.

(10) Patent No.: US 7,642,003 B2
(45) Date of Patent: Jan. 5, 2010

(54) SEALED TYPE HEAT EXCHANGING SYSTEM OF BATTERY PACK

(75) Inventors: Jaesung Ahn, Busan (KR); JongMin Park, Daejeon (KR); Do Yang Jung, Hwaseong-si (KR); John E. Namgoong, Daejeon (KR)

(73) Assignee: LG Chem, Ltd. (KR)

( * ) Notice: Subject to any disclaimer, the term of this patent is extended or adjusted under 35 U.S.C. 154(b) by 228 days.

(21) Appl. No.: 11/555,734

(22) Filed: Nov. 2, 2006

(65) Prior Publication Data

US 2007/0248876 A1   Oct. 25, 2007

(30) Foreign Application Priority Data

Nov. 3, 2005    (KR)  ............... 10-2005-0104658

(51) Int. Cl.
  *H01M 10/50*   (2006.01)
(52) U.S. Cl. ............... 429/120; 429/62; 62/3.7; 165/80.1
(58) Field of Classification Search ............... None
  See application file for complete search history.

(56) References Cited

U.S. PATENT DOCUMENTS 4,314,008 A * 2/1982 Blake .................. 429/8
5,813,233 A * 9/1998 Okuda et al. ............ 62/3.7
6,455,186 B1 * 9/2002 Moores et al. ........... 429/71
7,399,551 B2 * 7/2008 Yagi et al. ............. 429/148

FOREIGN PATENT DOCUMENTS

| JP | 2001-023703 | 1/2001 |
| JP | 2002-251951 | 9/2002 |
| KR | 1020060036694 | 5/2006 |

* cited by examiner

*Primary Examiner*—Patrick Ryan
*Assistant Examiner*—Cynthia Lee
(74) *Attorney, Agent, or Firm*—Cantor Colburn LLP

(57) ABSTRACT

Disclosed herein is a heat exchange system that controls the temperature of a medium- or large-sized battery pack including a plurality of unit cells. The heat exchange system includes a sealed type housing surrounding the outer surface of the battery pack such that a predetermined flow channel, through which a heat exchange medium flows, is defined between the housing and the battery pack, a driving fan mounted in the housing for driving the heat exchange medium to flow, and a heat exchange unit mounted at one side of the housing for controlling the temperature of the heat exchange medium. In the heat exchange system according to the present invention, the heat exchange medium, for example, air is not introduced from the outside of the battery system, but is circulated in the battery system by the heat exchange unit. Consequently, the present invention has the effect of accomplishing the reduction in size of the battery system, reducing influences caused by external conditions, decreasing noise, and effectively controlling the optimum operating temperature of the battery pack.

9 Claims, 3 Drawing Sheets

SEALED TYPE HEAT EXCHANGING SYSTEM OF BATTERY PACK

FIELD OF THE INVENTION

The present invention relates to a system that is capable of controlling the temperature of a medium- or large-sized battery pack including a plurality of unit cells, and, more particularly, to a heat exchange system for battery packs, including a sealed type housing surrounding the outer surface of the battery pack such that a predetermined flow channel, through which a heat exchange medium flows, is defined between the housing and the battery pack, a driving fan mounted in the housing for driving the heat exchange medium to flow, and a heat exchange unit mounted at one side of the housing for controlling the temperature of the heat exchange medium.

BACKGROUND OF THE INVENTION

One of the biggest problems caused from vehicles using fossil fuel, such as gasoline and diesel oil, is creation of air pollution. A technology of using a secondary battery, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional engine, have been developed. Some of the electric vehicles and the hybrid electric vehicles are now being commercially used. A nickel-metal hydride (Ni-MH) secondary battery has been mainly used as the power source for the electric vehicles (EV) and the hybrid electric vehicles (HEV). In recent years, however, the use of a lithium-ion secondary battery has been attempted.

High output and large capacity are needed for such a secondary battery to be used as the power source for the electric vehicles (EV) and the hybrid electric vehicles (HEV). For this reason, a plurality of small-sized secondary batteries (unit cells) are connected in series or in parallel with each other so as to construct a battery module, and a plurality of battery modules are connected in parallel or in series with each other so as to construct a battery pack.

In such a high-output, large-capacity secondary battery, however, a large amount of heat is generated from the unit cells during the charge and the discharge of the unit cells. When the heat generated from the unit cells during the charge and the discharge of the unit cells is not effectively removed, heat is accumulated in the unit cells with the result that the unit cells are degraded. Consequently, it is necessary to provide a cooling system for vehicle battery packs, which are high-output, large-capacity secondary batteries.

Generally, a cooling system for vehicle battery packs is constructed in an air-cooling structure using air as a coolant. In the air-cooling structure, air is introduced into the cooling system from the outside of the cooling system to cool the battery pack, and is then discharged out of the cooling system. The outside of the cooling system includes the inside of a vehicle, such as a trunk and a passenger space, as well as the outside of the vehicle. However, the cooling system with the above-described construction has several problems.

First, the air used as the coolant is supplied from the outside of vehicle with the result that the air is considerably affected by external conditions, such as humidity and temperature. For this reason, it is necessary to provide an additional device for controlling the temperature and the humidity of the air. As a result, the size of the cooling system is increased. When air inside the vehicle is used as the coolant, the above problem is somewhat solved. In this case, however, it is necessary to provide inlet and outlet ports for introducing and discharging air, respectively. As a result, the size of the cooling system is increased.

Second, when, in spite of removal of foreign matter by filtering the coolant, some of the foreign matter is introduced through the inlet port and the outlet port, and is brought into contact with unit cells of a battery pack, the outer surfaces of the unit cells may be physically or chemically damaged. In addition, noise and vibration generated due to the operation of a coolant introduction device, such as a fan or a pump, may be transmitted to a passenger(s) through the inlet port and the outlet port.

In order to solve the above-stated problems, Japanese Unexamined Patent Publication No. 2001-023703 and No. 2002-251951 disclose a sealed type housing for battery packs. In the disclosures of these publications, a coolant inlet port and a coolant outlet port are omitted, and heat is absorbed using a heat transfer plate or a wide cooling flow channel is provided between unit cells to remove heat from the unit cells, thereby solving the problems caused from the inlet port and the outlet port as described above. Nevertheless, a large amount of heat cannot be effectively removed by the structures disclosed in the publications. As a result, the structures disclosed in the publications are not suitable for vehicles using a large-sized battery pack, such as electric vehicles (EV) and hybrid electric vehicles (HEV).

Meanwhile, the vehicles, such as the electric vehicles (EV) and the hybrid electric vehicles (HEV), may be operated under the tough conditions. For example, when a vehicle is at low temperature in the winter season, it is necessary to stop the operation of a cooling system such that a battery pack can be operated at the optimum operating temperature. Alternatively, it may be necessary to increase the temperature of air introduced into the battery pack such that the operating temperature of the battery pack can be controlled to be the optimum temperature level. In this case, it is necessary to provide an additional device. In addition, when the unit cells of the battery pack have low temperature, battery components may be damaged. Furthermore, the degradation of the battery components may be accelerated due to the abrupt increase of the temperature of the air introduced into the battery pack.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have developed a heat exchange system that is capable of circulating a coolant for cooling a battery pack therein by a heat exchange unit without introduction of the coolant from the outside of the heat exchange system, and found that the developed heat exchange system has the effect of accomplishing the reduction in size of a battery system, reducing influences caused by external conditions, decreasing noise, and effectively controlling the optimum operating temperature of the battery pack.

Consequently, it is an object of the present invention to provide a heat exchange system that is capable of circulating a coolant in a battery system.

In accordance with the present invention, the above and other objects can be accomplished by the provision of a heat exchange system that controls the temperature of a medium- or large-sized battery pack including a plurality of unit cells, wherein the heat exchange system comprises: a sealed type housing surrounding the outer surface of the battery pack such that a predetermined flow channel, through which a heat exchange medium flows, is defined between the housing and the battery pack; a driving fan mounted in the housing for driving the heat exchange medium to flow; and a heat exchange unit mounted at one side of the housing for controlling the temperature of the heat exchange medium.

In the present invention, the "heat exchange medium" is a medium that is free to flow in the heat exchange system and can easily control the optimum operating temperature of the battery pack. Preferably, the heat exchange medium is air.

When the temperature of the battery pack is higher than the optimum operating temperature, the heat exchange medium absorbs heat generated from the battery pack and transmits the absorbed heat to the heat exchange unit, thereby removing the heat from the battery pack. When the temperature of the battery pack is lower than the optimum operating temperature, on the other hand, the heat exchange medium absorbs heat generated from the heat exchange unit and transmits the absorbed heat to the battery pack, thereby increasing the temperature of the battery pack. In this way, the optimum operating temperature of the battery pack is controlled.

Preferably, the heat exchange unit according to the present invention includes a heat control member controllable by a control unit mounted in the battery pack or by a control unit of a device in which the battery pack is mounted, an inner heat exchange member mounted at the inner surface of the housing while the inner heat exchange member is in contact with the heat control member, and an outer heat exchange member mounted at the outer surface of the housing while the outer heat exchange member is in contact with the heat control member.

The control unit controls the heat control member to control the measured interior temperature of the battery system to be the optimum operating temperature. When the control unit is mounted in the battery pack, the control unit may be a battery management system (BMS) of the battery pack.

A preferred example of the heat control member is a thermoelectric element constructed such that, when electric current is supplied to the thermoelectric element, an endothermic reaction and an exothermic reaction occur at opposite ends of the thermoelectric element, respectively. The ends at which the endothermic reaction and the exothermic reaction occur are decided depending upon directions in which the electric current is supplied to the thermoelectric element. Preferably, the thermoelectric element is a Peltier element.

When the measured temperature of the battery pack is higher than the optimum operating temperature level, electric current is supplied to the heat control member such that an endothermic reaction occurs at the end of the heat control member adjacent to the inner heat exchange member, and an exothermic reaction occurs at the end of the heat control member adjacent to the outer heat exchange member. As a result, heat is discharged out of the battery system. When the measured temperature of the battery pack is lower than the optimum operating temperature level, on the other hand, electric current is supplied to the heat control member such that an exothermic reaction occurs at the end of the heat control member adjacent to the inner heat exchange member, and an endothermic reaction occurs at the end of the heat control member adjacent to the outer heat exchange member. As a result, the interior temperature of the battery system is increased.

The inner heat exchange member is brought into direction contact with the heat exchange medium to control the temperature of the heat exchange medium.

Preferably, the heat exchange members are constructed in a structure in which a plurality of fins made of a material having high heat conductivity are arranged in line so as to maximize the contact area between the respective heat exchanger members and the heat exchange medium. The heat exchange members are located at the opposite ends of the heat control member, respectively.

In a preferred embodiment, the sealed type housing is provided at one or more inner surfaces thereof with partitions for dividing the heat exchange medium into predetermined flow channels, and the sealed type housing is made of an insulating material. The details of the partition structure for dividing the flow channels are disclosed in Korean Patent Application No. 2004-85765, which has been filed in the name of the applicant of the present patent application. The disclosure of the above-mentioned patent application is hereby incorporated by reference as if fully set forth herein.

Preferably, the driving fan is located adjacent to the heat exchange unit, whereby the smooth flow of the heat exchange medium and the rapid heat exchange reaction are accomplished.

In order to prevent the mixture between low-temperature heat exchange medium and high-temperature heat exchange medium, it is preferable that the heat exchange system further include a first pipe for allowing the heat exchange medium to flow from the battery pack to the heat exchange unit therethrough, and a second pipe for allowing the heat exchange medium to flow from the heat exchange unit to the battery pack therethrough, the first pipe and the second pipe being separated from each other while the first pipe and the second pipe are spaced apart from each other.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 1:
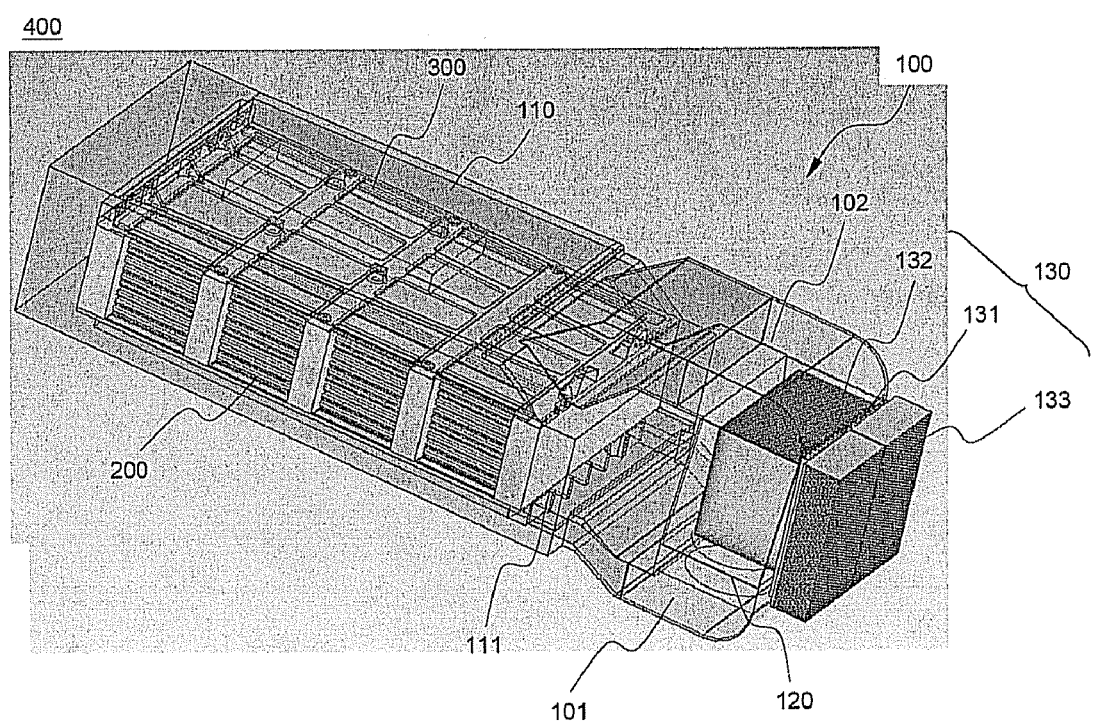
FIG. 1 is a perspective view illustrating a battery system including a sealed type heat exchange system according to the present invention.

FIG. 1 is a perspective view illustrating a battery system including a sealed type heat exchange system according to the present invention.

Referring to FIG. 1, a battery system 400 is constructed in a structure in which a battery pack 200 and a control unit 300 are mounted in a heat exchange system 100.

The battery pack 200 is constructed in a structure in which a plurality of unit cells, such as pouch-shaped battery cells, are stacked one on another, and are then mounted to a sheathing member, such as a cartridge or a frame, while the unit cells are electrically connected with each other. The operation of the battery pack 200 is controlled by the control unit 300, for example, a battery management system (BMS).

The heat exchange system 100 includes a housing 110 surrounding the outer surface of the battery pack 200, a driving fan 120 for driving air, as a heat exchange medium, such that the air can smoothly flow, and a heat exchange unit 130 for controlling the temperature of the air.

A plurality of partitions 111 are formed at the inner lower-end surface and the inner upper-end surface of the housing 110 for dividing air flow channels, through which the air flows. In order to prevent the mixture between low-temperature air and high-temperature air, the heat exchange system 100 further includes a first pipe 101, through which the air flows from the battery pack 200 to the heat exchange unit 130, and a second pipe 102, through which the air flows from the heat exchange unit 130 to the battery pack 200. The first pipe 101 and the second pipe 102 are separated from each other while the first pipe 101 and the second pipe 102 are spaced apart from each other.

The driving fan 120 is disposed below an inner heat exchange member 132 such that the air flowing through the first pipe 101 can be rapidly moved to the heat exchange unit 130, and the air having passed through the heat exchange unit 130 can rapidly flow through the second pipe 102.

The heat exchange unit 130 includes a Peltier element 131, as a heat control member, interposed between an inner heat exchange member 132 and an outer heat exchange member 133, which are located at the opposite major surfaces of the Peltier element 131, respectively.

The inner heat exchanger member 132 is constructed in a structure in which a plurality of fins, which are made of a material having high heat conductivity, are arranged in line to increase the contact area between the inner heat exchanger member 132 and the heat exchange medium, i.e., the air, and thus to improve the heat transfer efficiency. The fins are arranged in parallel with the flow direction of the air. Since the air flows vertically between the first pipe 101 and the second pipe 102, the fins are also vertically arranged in parallel with each other. In the same manner, the outer heat exchange member 133 is constructed in the above-described fin arranging type structure to improve the efficiency of heat transfer with external air.

The operations of the driving fan 120 and the Peltier element 131 of the heat exchange unit 130 may be controlled by the control unit 300 of the battery pack 200 or directly controlled by a control unit of a device in which the battery system 400 is mounted. For example, thermistors (not shown) may be mounted at unit cells or battery modules of the battery pack 200, and temperate-related signals transmitted from the thermistors are detected by the control unit 300 to control the operations of the driving fan 120 and the heat exchange unit 130.

Figure 2:
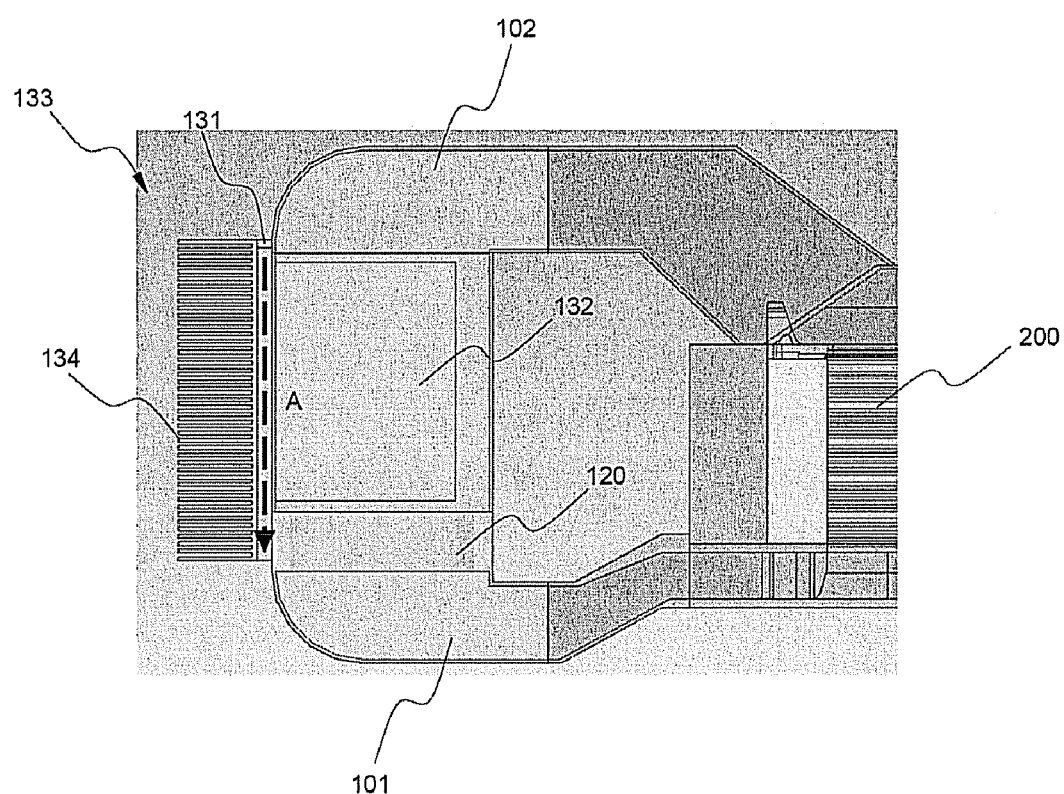
FIG. 2 is an enlarged view, in section, of the heat exchange system shown in FIG. 1, typically illustrating a process for removing heat from the interior of the battery system.

FIG. 2 is an enlarged view, in section, of the heat exchange system shown in FIG. 1, typically illustrating a process for removing heat from the interior of the battery system.

Referring to FIG. 2, when the detected temperature of the battery pack 200 is higher than the optimum temperature level, electric current is supplied to the Peltier element 131 in an A direction under the control of the control unit 300 (see FIG. 1), whereby an endothermic reaction occurs at the inner heat exchange member 132, and an exothermic reaction occurs at the outer heat exchange member 133. Consequently, as high-temperature air having absorbed heat from the battery pack 200 is moved to the inner heat exchange member 132 through the first pipe 101, a considerable amount of heat is transmitted from the high-temperature air to the inner heat exchange member 132 due to the endothermic reaction of the inner heat exchange member 132 with the result that the temperature of the air is lowered. The low-temperature air is then moved to the battery pack 200 through the second pipe 102.

As described above, the inner heat exchange member 132 and the outer heat exchange member 133 are constructed in a structure in which the plurality of fins are arranged in line. Specifically, the fins of the inner heat exchange member 132 are vertically arranged in parallel with each other. FIG. 2 illustrates only the outermost fin at one side of the inner heat exchange member 132. On the other hand, the fins 134 of the outer heat exchange member 133 are horizontally arranged with each other. The arrangement of the fins 134 is clearly illustrated in FIG. 2.

Figure 3:
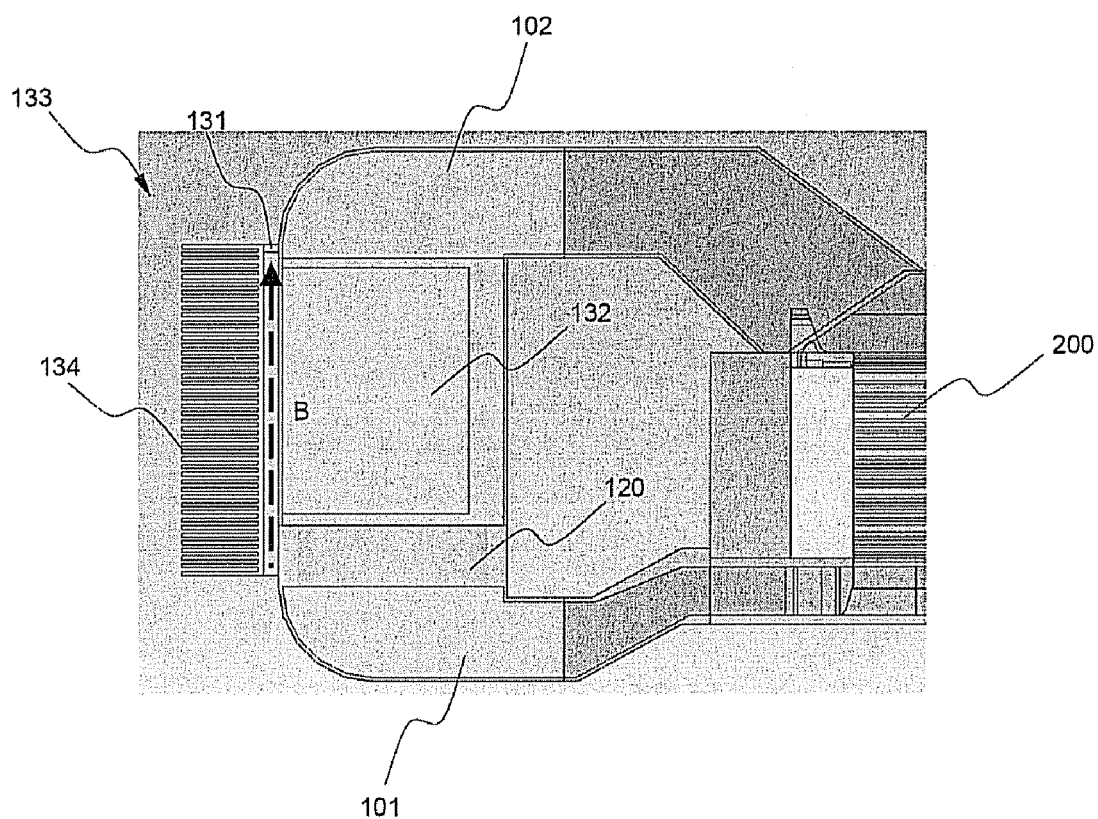
FIG. 3 is an enlarged view, in section, of the heat exchange system shown in FIG. 1, typically illustrating a process for transferring heat into the interior of the battery system.

FIG. 3 is an enlarged view, in section, of the heat exchange system shown in FIG. 1, typically illustrating a process for transferring heat into the interior of the battery system.

Referring to FIG. 3, when the detected temperature of the battery pack 200 is lower than the optimum temperature level, electric current is supplied to the Peltier element 131 in a B direction under the control of the control unit, whereby an exothermic reaction occurs at the inner heat exchange member 132, and an endothermic reaction occurs at the outer heat exchange member 133. Consequently, as low-temperature air having passed through the battery pack 200 is moved to the inner heat exchange member 132 through the first pipe 101, heat is transmitted from the inner heat exchange member 132 to the low-temperature air due to the exothermic reaction of the inner heat exchange member 132 with the result that the temperature of the air is raised. The high-temperature air is then moved to the battery pack 200 through the second pipe 102.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, in the heat exchange system according to the present invention, the air, as the heat exchange medium, is not introduced from the outside of the heat exchange system, but is circulated in the heat exchange system by the heat exchange unit. Consequently, the present invention has the effect of accomplishing the reduction in size of the battery system, reducing influences caused by external conditions, decreasing noise, and effectively controlling the optimum operating temperature of the battery pack.

What is claimed is:

1. A heat exchange system that controls the temperature of a medium- or large-sized battery pack including a plurality of unit cells, wherein the heat exchange system comprises:
   a sealed type housing surrounding the outer surface of the battery pack such that a predetermined flow channel, through which a heat exchange medium flows, is defined between the housing and the battery pack, wherein the sealed type housing is made of an insulating material;
   a driving fan mounted in the housing for driving the heat exchange medium to flow;
   a heat exchange unit mounted at one side of the housing for controlling the temperature of the heat exchange medium;

a first pipe, one end of which is connected to one end the predetermined flow channel and the other end of which is connected to the heat exchange unit; and a second pipe, one end of which is connected to the other end of the predetermined flow channel and the other end of which is connected to the heat exchange unit.

2. The heat exchange system according to claim 1, wherein the heat exchange medium is air.

3. The heat exchange system according to claim 1, wherein the heat exchange unit includes a heat control member controllable by a control unit mounted in the battery pack or by a control unit of a device in which the battery pack is mounted, an inner heat exchange member mounted at the inner surface of the housing while the inner heat exchange member is in contact with the heat control member, and an outer heat exchange member mounted at the outer surface of the housing while the outer heat exchange member is in contact with the heat control member.

4. The heat exchange system according to claim 3, wherein the heat control member is a Peltier element.

5. The heat exchange system according to claim 3, wherein the heat exchange members are constructed in a structure in which a plurality of fins made of a material having high heat conductivity are arranged in line.

6. The heat exchange system according to claim 3, wherein the heat control member is controlled by a battery management system of the battery pack.

7. The heat exchange system according to claim 1, wherein the sealed type housing is provided at one or more inner surfaces thereof with partitions for dividing the heat exchange medium into predetermined flow channels.

8. The heat exchange system according to claim 1, wherein the driving fan is located adjacent to the heat exchange unit.

9. The heat exchange system according to claim 1, wherein the first pipe and the second pipe are separated from each other while the first pipe and the second pipe are spaced apart from each other.

* * * * *